United States Patent
Bathla et al.

(10) Patent No.: US 12,263,940 B2
(45) Date of Patent: Apr. 1, 2025

(54) ADDITIONAL SAFETY FEATURE IN AIRCRAFT BRAKING SYSTEM

(71) Applicant: GOODRICH CORPORATION, Charlotte, NC (US)

(72) Inventors: Dharamveer Bathla, Bangalore (IN); Manju Maheve, Bangalore (IN); Paul R. Burte, Clayton, OH (US); Udhayakumar Mani, Coimbatore (IN)

(73) Assignee: GOODRICH CORPORATION, Charlotte, NC (US)

( * ) Notice: Subject to any disclaimer, the term of this patent is extended or adjusted under 35 U.S.C. 154(b) by 197 days.

(21) Appl. No.: 18/093,749

(22) Filed: Jan. 5, 2023

(65) Prior Publication Data
US 2024/0124133 A1 Apr. 18, 2024

(30) Foreign Application Priority Data
Oct. 18, 2022 (IN) .............................. 202241059474

(51) Int. Cl.
*B64C 25/42* (2006.01)
*B64C 25/44* (2006.01)

(52) U.S. Cl.
CPC .............. *B64C 25/42* (2013.01); *B64C 25/44* (2013.01)

(58) Field of Classification Search
CPC ....... B64C 25/42; B64C 25/44; B64C 25/423; B64C 25/426
See application file for complete search history.

(56) References Cited

U.S. PATENT DOCUMENTS

| | | | |
|---|---|---|---|
| 6,134,956 A | 10/2000 | Salamat et al. | |
| 6,183,051 B1 | 2/2001 | Hill et al. | |
| 6,820,946 B2 | 11/2004 | Salamat et al. | |
| 7,128,376 B2 | 10/2006 | Williams et al. | |
| 7,396,088 B2 | 7/2008 | Nilsson et al. | |
| 8,214,121 B2 | 7/2012 | Cahill et al. | |
| 8,244,430 B2 | 8/2012 | Izumikawa et al. | |
| 8,280,603 B2 | 10/2012 | Cahill | |
| 10,564,662 B2 | 2/2020 | Suntharalingam | |
| 2010/0038188 A1 | 2/2010 | Cahill | |

FOREIGN PATENT DOCUMENTS

| | | | |
|---|---|---|---|
| CN | 108458680 | 8/2018 | |
| EP | 3309023 A1 * | 4/2018 | ............ B60T 8/1703 |
| EP | 3845423 | 7/2021 | |
| EP | 3309023 | 12/2021 | |

OTHER PUBLICATIONS

European Patent Office, European Search Report dated Jan. 18, 2024 in Application No. 23204435.4.

* cited by examiner

*Primary Examiner* — Jacob M Amick
(74) *Attorney, Agent, or Firm* — SNELL & WILMER L.L.P.

(57) ABSTRACT

A method for braking an aircraft is disclosed herein. The method includes receiving, by a brake controller, a first signal from a position sensor of a first pedal, receiving, by the brake controller, a second signal from a pedal sensor of the first pedal, determining, by the brake controller, that the pedal is being pressed based on the first and second signals, and sending, by the brake controller, an instruction to apply a brake pressure in response to the determination that the pedal is being pressed.

15 Claims, 4 Drawing Sheets

ADDITIONAL SAFETY FEATURE IN AIRCRAFT BRAKING SYSTEM

CROSS-REFERENCE TO RELATED APPLICATIONS

This application claims priority to, and the benefit of, India Provisional Patent Application No. 202241059474 (DAS CODE: 56AB), filed Oct. 18, 2022 and titled "ADDITIONAL SAFETY FEATURE IN AIRCRAFT BRAKING SYSTEM," which is incorporated by reference herein in its entirety for all purposes.

FIELD

The present disclosure generally relates aircraft braking systems and more specifically to aircraft braking system safety features.

BACKGROUND

Many aircraft include landing gear having wheel assemblies with independent braking for use during taxi, takeoff, and landing. The braking systems typically include a sensor that indicates a desired amount of braking to apply to each wheel. Sometimes, there may be an error reading the sensor which may result in uncommanded braking on one side of the wheels, resulting in the aircraft moving to one side.

SUMMARY

A method for braking an aircraft is disclosed herein. The method includes receiving, by a brake controller, a first signal from a position sensor of a first pedal, receiving, by the brake controller, a second signal from a pedal sensor of the first pedal, determining, by the brake controller, that the pedal is being pressed based on the first and second signals, and sending, by the brake controller, an instruction to apply a brake pressure in response to the determination that the pedal is being pressed. In various embodiments, the method further includes calculating, by the brake controller, an amount of pressure to apply based on the first signal. In various embodiments, the instruction to apply the brake pressure is based at least in part on the first signal.

In various embodiments, the method further includes receiving, by the brake controller, a third signal from a second position sensor of a second pedal, receiving, by the brake controller, a fourth signal from a second pedal sensor of the second pedal, determining, by the brake controller, that the second pedal is being pressed further than the first pedal based on the third and fourth signals, and sending, by the brake controller, the instruction to apply the brake pressure based on the third signal.

In various embodiments, detecting, by the brake controller, a fault based at least in part on the first signal and the second signal prior to sending the instruction to apply the brake pressure. In various embodiments, the position sensor provides an indication of how much the first pedal is displaced. In various embodiments, the pedal sensor provides an indication of whether or not the first pedal is being pressed.

Also disclosed herein is an article of manufacture including a tangible, non-transitory computer-readable storage medium having instructions stored thereon that, in response to execution by a processor, cause the processor to perform operations. The operations include receiving, by a brake controller, a first signal from a position sensor of a pedal, receiving, by the brake controller, a second signal from a pedal sensor of the pedal, determining, by the brake controller, whether or not the pedal is being pressed based on the first signal and the second signal, and sending, by the brake controller, an instruction to apply a brake pressure in response to a determination that the pedal is being pressed.

In various embodiments, the operations further include calculating, by the brake controller, an amount of pressure to apply based on the first signal. In various embodiments, the operations further include receiving, by the brake controller, a second amount of pressure to apply from a second brake controller, comparing, by the brake controller, the amount of pressure to apply and the second amount of pressure to apply, and sending, by the brake controller, the instruction to apply the brake pressure in response to a determination that the amount of pressure and the second amount of pressure are the same.

In various embodiments, the position sensor provides an indication of how far the pedal has travelled. In various embodiments, the pedal sensor provides an indication of whether or not the pedal is being pressed. In various embodiments, the operations further include identifying, by the brake controller, a fault based at least in part on the first signal and the second signal. In various embodiments, the operations further include receiving, by the brake controller, a third signal from a second position sensor of a second pedal, comparing, by the brake controller, the first signal and the third signal, and sending, by the brake controller, the instructions to apply the brake pressure based on the first signal, the first signal being greater than the second signal.

Also disclosed herein is a brake system for an aircraft. The brake system includes a brake assembly configured to supply a brake pressure in response to a pedal being displaced, a position sensor configured to provide an indication of an amount of displacement of the pedal, a pedal sensor configured to provide an indication that the pedal is being displaced, and a brake controller configured to control the brake pressure. The brake controller is configured to receive a first signal from the position sensor, receive a second signal from the pedal sensor, determine that the pedal is being activated, and modify the brake pressure as a function of pedal displacement in response to the determination that the pedal is being activated.

In various embodiments, the determination that the pedal is being activated is based on the first signal. In various embodiments, the determination that the pedal is being activated is further based on the second signal. In various embodiments, the first signal provides an indication of how much pressure to apply to the brake assembly. In various embodiments, the pedal sensor provides an indication that the pedal is being pressed. In various embodiments, the brake controller is further configured to identify a fault in the brake system based at least in part on the first signal and the second signal.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
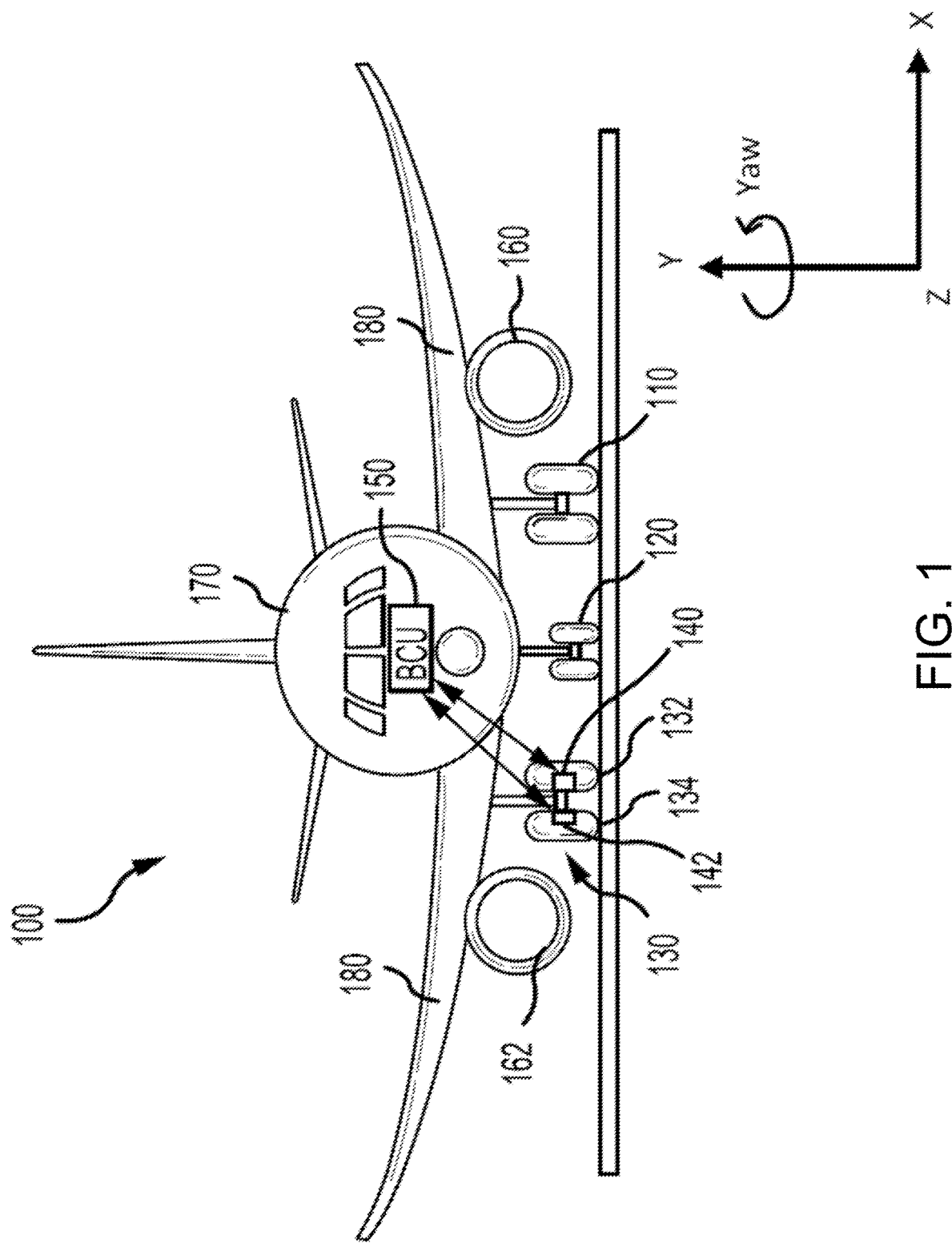
- FIG. 1 illustrates an aircraft having multiple landing gear and brakes, in accordance with various embodiments.

Referring now to FIG. 1, an aircraft 100 in accordance with various embodiments can include multiple landing gears including a first landing gear 110, a second landing gear 120, and a third landing gear 130. Each landing gear may include one or more wheel assemblies. For example, the third landing gear 130 includes an inner wheel assembly 132 and an outer wheel assembly 134.

The aircraft 100 may further include one or more brakes coupled to each wheel assembly. For example, a first brake 140 may be coupled to the inner wheel assembly 132, and a second brake 142 may be coupled to the outer wheel assembly 134. The first brake 140 may apply a braking force to the inner wheel assembly 132 upon receiving a brake command. Similarly, the second brake 142 may apply a braking force to the outer wheel assembly 134 upon receiving a brake command.

The aircraft 100 may further include a brake control unit (BCU) or brake controller 150. The brake controller 150 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the brake controller 150 may be specifically designed for controlling operation of aircraft brakes. The brake controller 150 may control operation of the first brake 140 and the second brake 142 under normal operating conditions.

The aircraft 100 further comprises a first gas turbine engine 160 and a second gas turbine engine 162. Although described herein with respect to gas turbine engines 160, 162, the present disclosure is not limited in this regard. For example, electric engines, hydrogen engines, gas turbine engines, or any combination may be within the scope of this disclosure. The first gas turbine engine 160 and the second gas turbine engine 162 are disposed on opposite sides of a fuselage 170 of the aircraft 100. Although illustrated as being coupled to wings 180 of the aircraft 100, the present disclosure is not limited in this regard. For example, gas turbine engines 160, 162 may be coupled to the fuselage 170, in accordance with various embodiments. The gas turbine engines 160, 162 may be controlled by a pilot to generate thrust to accelerate the aircraft 100. In various embodiments, the first gas turbine engine 160 is on a left side of the aircraft 100 and the second gas turbine engine 162 is on a right side of the aircraft 100. Left and right as disclosed herein refer to a direction determined from a center of the fuselage 170 while facing a forward direction (i.e., a direction defined from a tail to a front end of aircraft 100).

Figure 2:
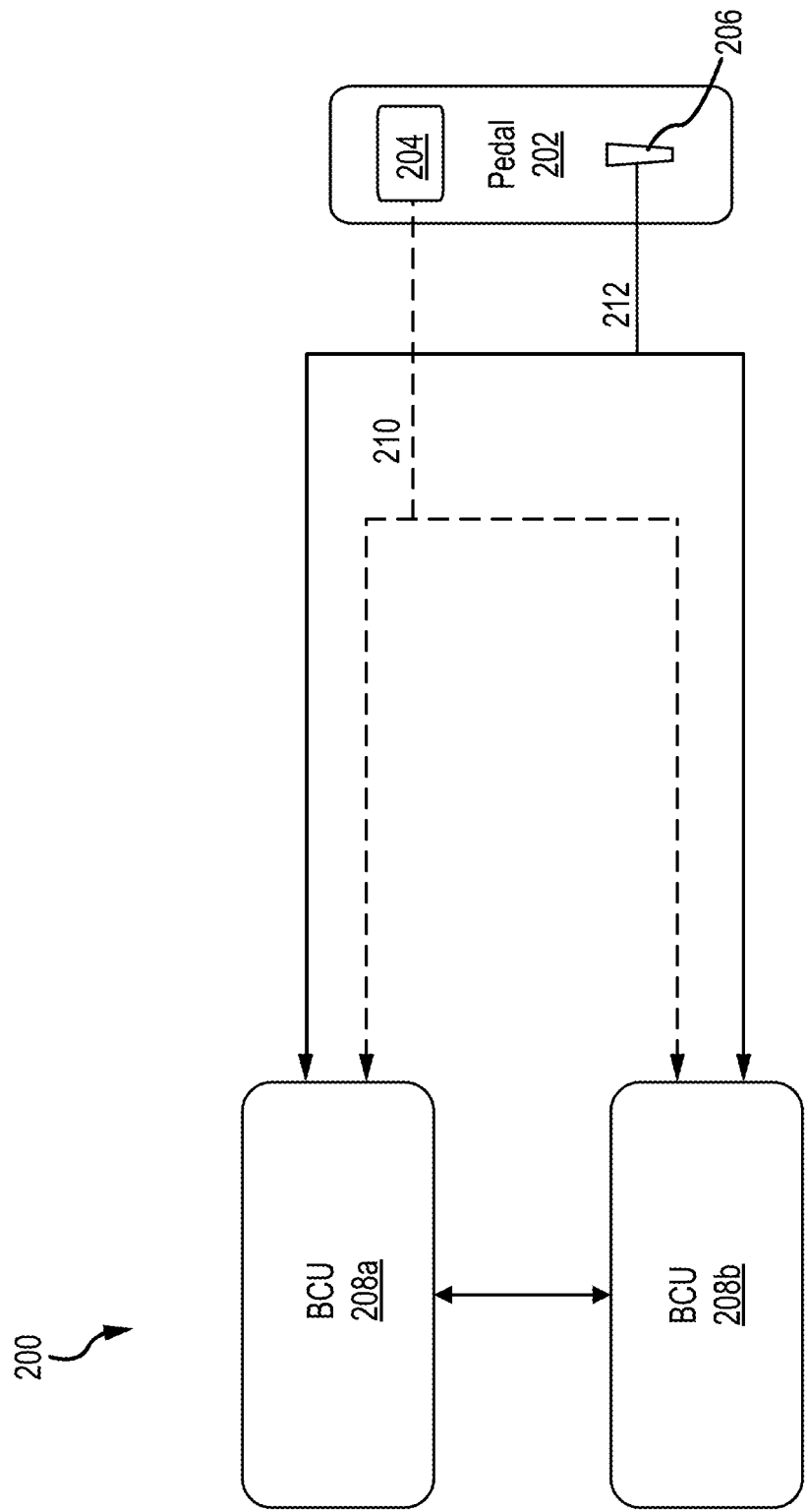
FIG. 2 illustrates a system architecture for a brake pedal and brake control units, in accordance with various embodiments.

Referring now to FIG. 2, in accordance with various embodiments, a brake control architecture 200 is illustrated. Brake control architecture 200 includes a pedal 202, a position sensor 204, a pedal sensor 206, a first brake controller 208a, or BCU, and a second brake controller 208b, or BCU. Pedal 202 may be used by a pilot, or co-pilot, to control brakes of a landing gear, such as for example, first brake 140 and second brake 142 of third landing gear 130 described above with respect to FIG. 1.

Position sensor 204 is configured to send a position command 210 to first brake controller 208a and second brake controller 208b indicating the amount of braking to apply to the brakes associated with pedal 202. In various embodiments, the position sensor 204 may be a linear variable differential transformer (LVDT) that is configured to send position command 210 to the first brake controller 208a and second brake controller 208b. For example, command 210 may be a voltage related to a distance of travel of the LVDT. In other words, the LVDT provides an indication of the position of pedal 202, or in other words, how far pedal 202 is being pressed, or moved. First brake controller 208a and second brake controller 208b use the position of pedal 202, as provided by position sensor 204 in position command 210, to determine an amount of braking to apply to the wheel assembly (e.g., outer wheel assembly 134 and inner wheel assembly 132) by the brakes (e.g., first brake 140 and second brake 142).

Pedal sensor 206 detects if pedal 202 is being pressed, providing a second verification that pedal 202 is being pressed. Pedal sensor 206 is configured to send a pedal command 212 to first brake controller 208 and second brake controller 208b indicating the status of pedal 202, either pressed or not pressed. In various embodiments, pedal sensor 206 may output command 212 as a voltage, interpreted by first and second brake controllers 208a, 208b as a one or true, in response to pedal 202 being pressed. In various embodiments, pedal sensor 206 may provide no output, the lack of output being interpreted by first and second brake controllers 208a, 208b as a zero or false, in response to pedal 202 not being pressed. In various embodiments, pedal sensor 206 may output command 212 as a first voltage in response to pedal 202 being pressed and as a second lower voltage in response to pedal 202 not being pressed. Command 212 may be interpreted by first and second brake controllers 208a, 208b as a one, or true, when the first voltage is above a threshold, such as for example, 3.3 V. Command 212 may be interpreted by first and second brake controllers 208a, 208b as a zero, or false, when the output voltage is below the threshold.

In various embodiments, a single brake controller may be used. In various embodiments, first brake controller 208a and second brake controller 208b may compare outputs and apply braking in response to both brake controllers 208a and 208b providing the same output. In various embodiment, first brake controller 208a may be a primary brake controller and second brake controller 208b may be a secondary, or backup, brake controller. In various embodiments, first brake controller 208a may provide braking commands for first landing gear 110 and second brake controller 208b may provide braking commands for third landing gear 130. In various embodiments, first brake controller 208a may provide braking commands for the inboard wheels of first landing gear 110 and third landing gear 130 (e.g., first brake 140) and second brake controller 208b may provide braking commands for the outboard wheels of first landing gear 110 and third landing gear 130 (e.g., second brake 142).

Occasionally a fault, or error, occurs in brake control architecture 200. Such an error may result in one or more brakes being applied when the pilot and/or co-pilot did not intend to apply the brakes. For example, an error may cause first brake 140 and/or second brake 142 to be applied to third landing gear 130 while no brakes are applied to first landing gear 110. This may cause aircraft 100 to turn, or yaw, during take-off or landing, which may result in a catastrophic event including damage to the aircraft and injury to passengers and crew.

TABLE 1 is a logic truth table used by first brake controller 208a and second brake controller 208b. TABLE 1 includes eight rows and five columns. The first column is an index column for easier reference to the rows. The second column, Pilot Action, lists the intended action of the pilot, or co-pilot, either Pressed or Not Pressed. That is, Pilot Action indicates the presence of physical input on pedal 202. The third column, Position Sensor, states whether position sensor 204 is providing output (e.g., position command 210). A 1 indicates that position sensor 204 is providing output, and No Output indicates that position sensor 204 is not providing output. The fourth column, Pedal Sensor, states whether pedal sensor 206 is providing output (e.g., pedal command 212). A 1 indicates that pedal sensor 206 is providing output and No Output indicates that pedal sensor 206 is not providing output. The fifth column, Brake Application, provides the action taken by first and second brake controller 208a, 208b when provided the given inputs.

TABLE 1

| | Pilot Action | Position Sensor | Pedal Sensor | Brake Application |
|---|---|---|---|---|
| 1 | Pressed | 1 | 1 | Applied |
| 2 | Pressed | 1 | Out of Range | Applied |
| 3 | Not Pressed | 1 | Out of Range | Not Applied |
| 4 | Not Pressed | 1 | 0 | Not Applied |
| 5 | Pressed | No Output | 1 | Not Applied |
| 6 | Pressed | No Output | Out of Range | Not Applied |
| 7 | Not Pressed | No Output | Out of Range | Not Applied |
| 8 | Not Pressed | No Output | 0 | Not Applied |

TABLE 1-continued

| Pilot Action | Position Sensor | Pedal Sensor | Brake Application |
|---|---|---|---|

At row 1, a normal operation condition with no faults is presented. The pilot is pressing pedal 202. Position sensor 204 sends position command 210 to first and second brake controller 208a, 208b in response to pedal 202 being pressed. Pedal sensor 206 sends pedal command 212 to first and second brake controller 208a, 208b in response to pedal 202 being pressed. First brake controller 208a and/or second brake controller 208b compare the inputs and apply the brakes in response to receiving position command 210 and pedal command 212.

At row 2, a faulty sensor output is detected. The pilot is pressing pedal 202. Position sensor 204 sends position command 210 to first and second brake controller 208a, 208b in response to pedal 202 being pressed. However, pedal sensor 206 sends a faulty command 212 to first and second brake controller 208a, 208b. For example, command 212 may be considered out of the range of the expected signal, either too high or too low. In various embodiments, pedal sensor 206 sends a digital signal that is expected to be between 2.5 volts and 3.5 volts and faulty command 212 may be about 4.5 volts, for example. While this indicates a problem with pedal sensor 206, this is the current operational state of first and second brake controllers 208a, 208b without pedal sensor 206. Therefore, first and second brake controllers 208a, 208b may apply the brakes, ignoring the No Output from pedal sensor 206.

At row 3, a faulty position sensor output is detected. The pilot is not pressing pedal 202. However, position sensor 204 sends a faulty position command 210 to first and second brake controller 208a, 208b and pedal sensor 206 sends a faulty pedal command 212 to first and second brake controller 208a, 208b. This is an error condition for both sensors and is recognized as such by the brake controller based in part on the faulty pedal command 212. For example, pedal command 212 may be faulty due to being outside of the range of the expected signal, either too high or too low.

At row 4, an un-commanded braking condition occurred. The pilot is not pressing pedal 202. However, position sensor 204 sends a faulty position command 210 to first and second brake controller 208a, 208b. Pedal sensor 206 works as intended, providing no output to first and second brake controllers 208a, 208b. In various embodiments, pedal sensor 206 may send a logical '0' to first and second brake controllers 208a, 208b. First and second brake controllers 208a, 208b compare the information available (i.e., command 210 and no command 212) and does not apply the brakes. The un-commanded braking condition present in row 4 is difficult to detect without pedal sensor 206. In such a condition, there is currently no way to detect whether the position command 210 is real and intended by the pilot. This may result in the pilot reacting incorrectly to a braking situation resulting in damage and/or injury.

At row 5, there is a loss of position signal. The pilot is pressing pedal 202. However, position sensor 204 is not providing output to first and second brake controllers 208a, 208b. Pedal sensor 206 sends pedal command 212 to first and second brake controller 208a, 208b in response to pedal 202 being pressed. While there is an indication that pedal 202 is being pressed, there is no indication as to how much braking to apply. Therefore, first and second brake controllers 208a, 208b do not apply the brakes.

At row 6, there is a loss of position signal and pedal signal. The pilot is pressing pedal 202, however, neither position sensor 204 nor pedal sensor 206 are outputting a signal. In various embodiments pedal sensor 206 may provide an output that is outside of the expected output range, either too high or too low. In this case, first and second brake controllers 208a, 208b do not apply the brakes.

At row 7, a faulty pedal sensor is detected. The pilot is not pressing pedal 202. Position sensor 204 is not outputting a signal but pedal sensor 206 is outputting a signal. In various embodiments, pedal sensor 206 may output a faulty signal that is either higher or lower than the expected signal range. This indicates a faulty pedal sensor 206.

At row 8, a normal operation condition with no faults is presented. The pilot is not pressing pedal 202. Both position sensor 204 and pedal sensor 206 do not output a signal to first and second brake controllers 208a, 208b. Therefore, first and second brake controllers 208a, 208b do not apply the brakes.

Figure 3:
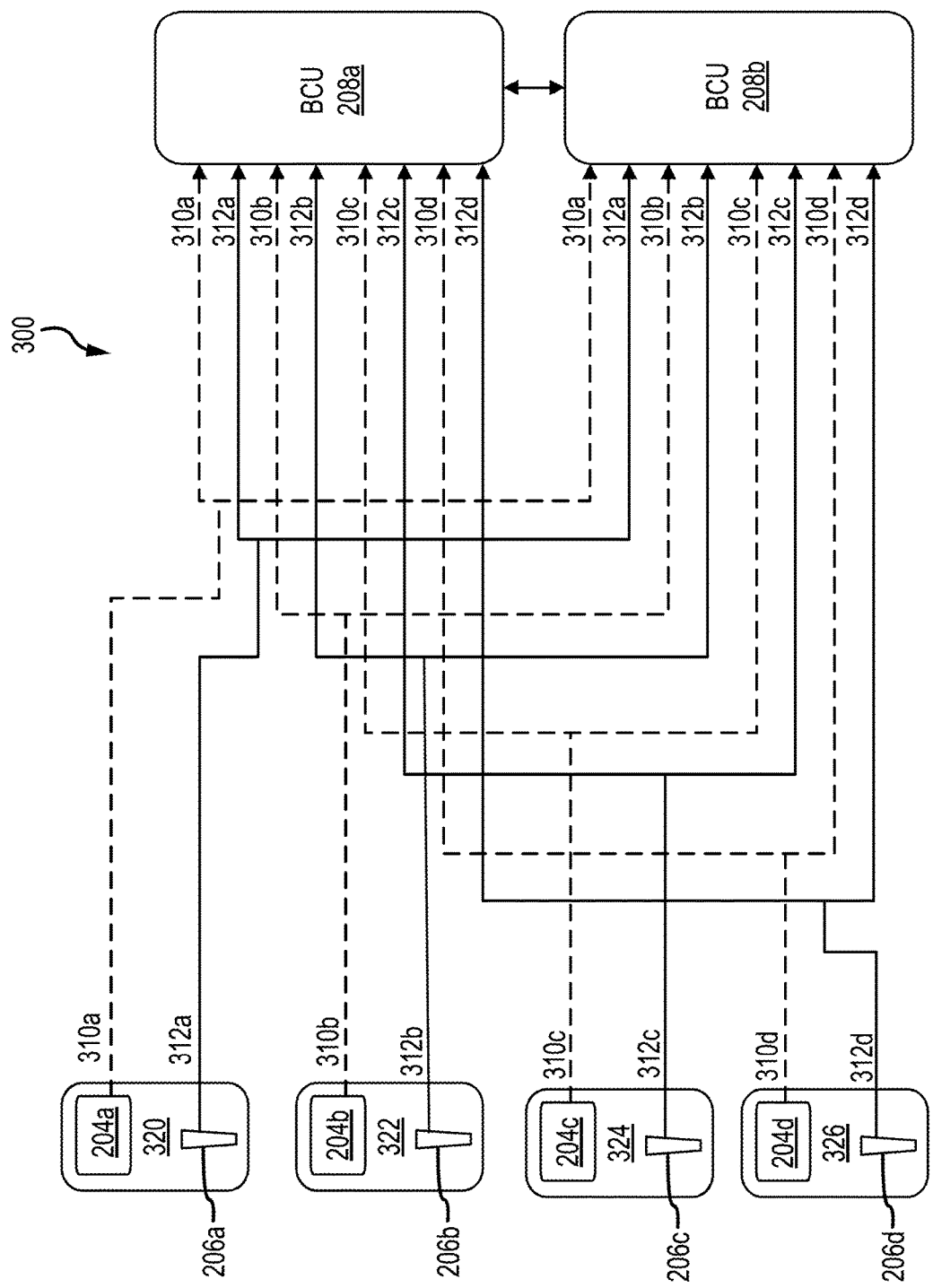
FIG. 3 illustrates a system architecture for multiple brake pedals and brake control units, in accordance with various embodiments.

Referring now to FIG. 3, in accordance with various embodiments, a brake control architecture 300 is illustrated. Brake control architecture 300 may be used by a pilot and co-pilot to control brakes (e.g., first brake 140 and second brake 142) of an aircraft 100, for example. Brake control architecture 300 includes similar components to brake control architecture 200 described above with respect to FIG. 2. Notably, brake control architecture 300 includes a first pilot pedal 320, a second pilot pedal 322, a first co-pilot pedal 324, a second co-pilot pedal 326, a first brake controller 208a, and a second brake controller 208b. Each pedal 320, 322, 324, 326 includes a position sensor 204 and a pedal sensor 206, as described above with respect to FIG. 2.

As illustrated, first pilot pedal 320 includes position sensor 204a and pedal sensor 206a. Second pilot pedal 322 includes position sensor 204b and pedal sensor 206b. First co-pilot pedal 324 includes position sensor 204c and pedal sensor 206c. Second co-pilot pedal 326 includes position sensor 204d and pedal sensor 206d. Position sensors 204 (i.e., 204a, 204b, 204c, and 204d) and pedal sensors 206 (i.e., 206a, 206b, 206c, 206d) include the various features described above with respect to FIG. 2 which are not repeated here. Each position sensor 204 is configured to send a command 310 to first brake controller 208a and second brake controller 208b, as described above with respect to FIG. 2. Each pedal sensor 206 is configured to send a command 312 to first brake controller 208a and second brake controller 208b, as described above with respect to FIG. 2.

The pilot uses first pilot pedal 320 to control a first brake, such as a brake for first landing gear 110. The pilot uses second pilot pedal 322 to control a second brake, such as a brake for third landing gear 130. This configuration allows the pilot to control the first brake with one foot (e.g., left foot) and the second brake with the other foot (e.g., right foot). Controlling first brake and second brake independently allows the pilot to steer aircraft 100 using the first and second brakes.

The co-pilot uses first co-pilot pedal 324 to control the first brake and second co-pilot pedal 326 to control the second brake. Similar to the pilot, this configuration allows the co-pilot to control the first brake with one foot (e.g., left foot) and the second brake with the other foot (e.g., right foot). This configuration allows either the pilot or the co-pilot to control the first and second brakes. At times, both the pilot and the co-pilot may be pressing one or more pedals 320, 322, 324, 326. When this happens, first brake controller 208a and/or second brake controller 208b may determine which input to use based on which set of pedals is being pressed harder (e.g., with more force or more distance travelled). First brake controller 208a and/or second brake controller 208b may then apply the brakes in response to the determination of which input to use.

Position sensor 204a sends command 310a to first brake controller 208a and second brake controller 208b in response to first pilot pedal 320 being pressed. Pedal sensor 206a sends command 312a to first brake controller 208a and second brake controller 208b in response to first pilot pedal 320 being pressed. Similarly, position sensor 204b sends command 310b to first brake controller 208a and second brake controller 208b in response to second pilot pedal 322 being pressed. Pedal sensor 206b sends command 312b to first brake controller 208a and second brake controller 208b in response to second pilot pedal 322 being pressed.

Position sensor 204c sends command 310c to first brake controller 208a and second brake controller 208b in response to first co-pilot pedal 324 being pressed. Pedal sensor 206c sends command 312c to first brake controller 208a and second brake controller 208b in response to first co-pilot pedal 324 being pressed. Similarly, position sensor 204d sends command 310d to first brake controller 208a and second brake controller 208b in response to second co-pilot pedal 326 being pressed. Pedal sensor 206d sends command 312d to first brake controller 208a and second brake controller 208b in response to second co-pilot pedal 326 being pressed.

Figure 4:
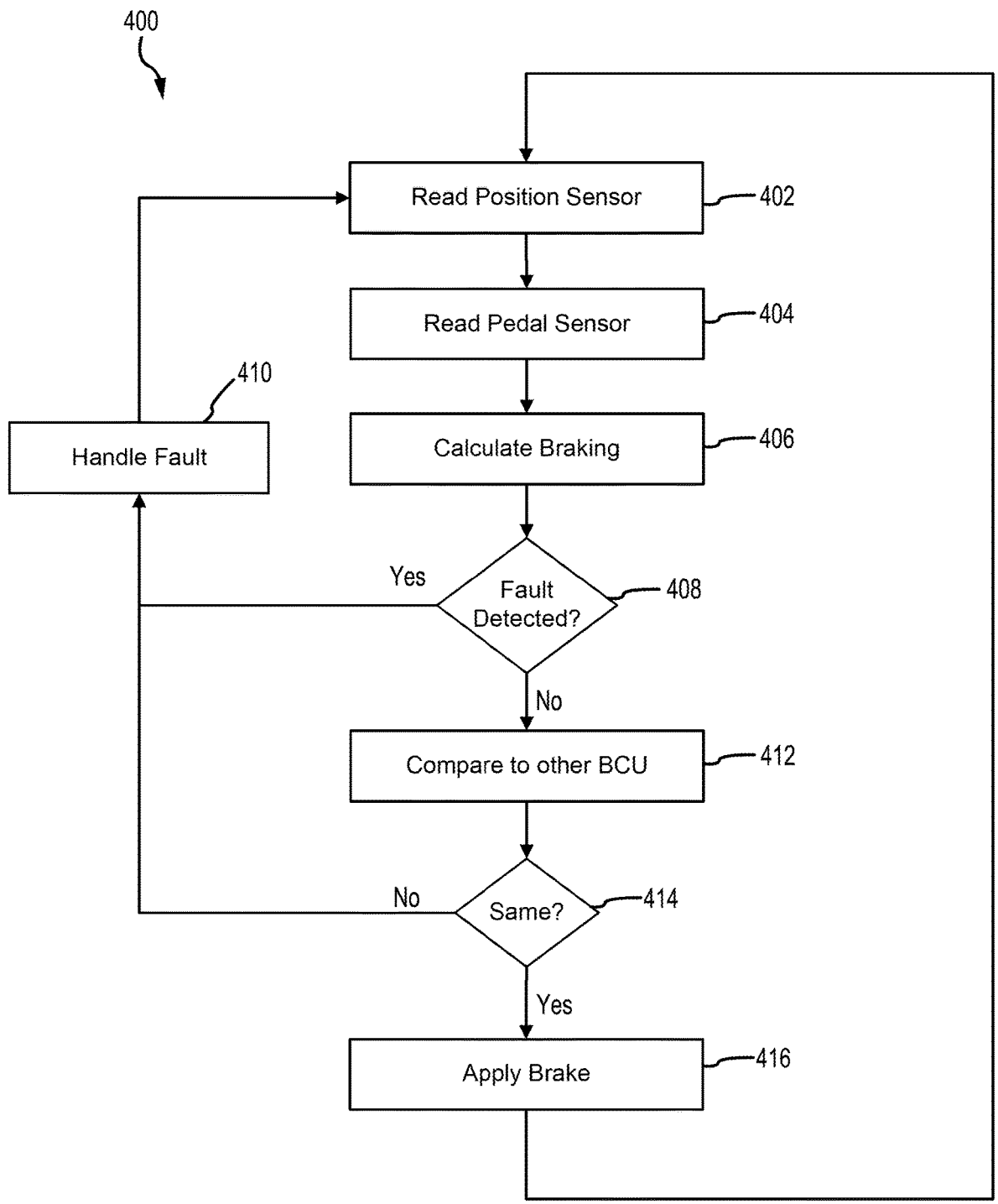
FIG. 4 illustrates a flow diagram of controlling braking for use in braking an aircraft, in accordance with various embodiments.

Referring now to FIG. 4, in accordance with various embodiments, illustrated is a method 400 for controlling braking of aircraft 100. In various embodiments, method 400 may be performed by first brake controller 208a and/or second brake controller 208b. In various embodiments, method 400 may be performed by one or more processors in one or more computer systems. For simplicity, the discussion below will refer to first brake controller 208a as performing method 400. Furthermore, references will be made in the discussion below to position sensor 204 and pedal sensor 206, described above with respect to FIGS. 2 and 3.

At block 402, first brake controller 208a reads an output value from position sensor 204 of a brake pedal, such as pedal 202. First brake controller 208a either reads a value from position sensor 204 that correlates to a position of pedal 202 or does not read an output from position sensor 204. In various embodiments, the value from position sensor 204 may be a voltage value. In various embodiments, position sensor 204 continuously sends output to first brake controller 208a in response to pedal 202 being pressed and first brake controller 208a reads the output from position sensor 204 at discrete time intervals, such as for example, from about 1 ms to about 100 ms, and more specifically, about 10 ms to about 50 ms. In various embodiments, first brake controller 208a may read an output value from a position sensor 204 on more than one pedal, such as for example, position sensors 204 associated with first pilot pedal 320, second pilot pedal 322, first co-pilot pedal 324, and second co-pilot pedal 326.

At block 404, first brake controller 208a reads an output value from pedal sensor 206 of brake pedal 202. First brake controller 208a either reads a value from pedal sensor 206 that indicates pedal 202 is being pressed or does not read an output from pedal sensor 206. In various embodiments, the value from pedal sensor 206 may be a voltage value. In various embodiments, pedal sensor 206 continuously sends output to first brake controller 208a in response to pedal 202 being pressed and first brake controller 208a reads the output from pedal sensor 206 at discrete time intervals, such as for example, from about 1 ms to about 100 ms, and more specifically, about 10 ms to about 50 ms. In various embodiments, first brake controller 208a may read an output value from a pedal sensor 206 on more than one pedal, such as for example, pedal sensors 206 associated with first pilot pedal 320, second pilot pedal 322, first co-pilot pedal 324, and second co-pilot pedal 326.

At block 406, first brake controller 208a calculates an amount of braking to apply based on the values read from position sensor 204 and pedal sensor 206. First brake controller 208a may determine whether a fault occurred before calculating the amount of braking to apply. A fault may be detected when only first brake controller 208a reads output from only one of position sensor 204 and pedal sensor 206. In various embodiments, first brake controller 208a may use the truth table from TABLE 1 to determine whether a fault occurred. In various embodiments, first brake controller 208a may compare the output from position sensor 204a associated with first pilot pedal 320 and the output from position sensor 204c associated first co-pilot pedal 324 and determine which output to use for calculating the amount of braking to apply.

At decision block 408, first brake controller 208a determines whether a fault is detected. If it is determined that a fault is detected, then method 400 proceeds to block 410.

At block 410, first brake controller 208a handles the detected fault. In various embodiments, this may include switching control of braking to second brake controller 208b. In various embodiments, this may include alerting the pilot and/or co-pilot of the fault. In various embodiments, this may include saving the fault to a log for later retrieval.

Returning to decision block 408, if, instead, it is determined that no fault is detected, method 400 proceeds to block 412.

At block 412, first brake controller 208a compares the calculated braking to apply to a calculated braking to apply received from second brake controller 208b. Generally, the calculated braking by both brake controllers is the same value. However, in some instances the calculated braking received by one brake controller (e.g., first brake controller 208a) may be different than the calculated braking received by the other brake controller (e.g., second brake controller 208b). For example, there may be a bad connection between a position sensor (e.g., position sensor 204) and one of the brake controllers (e.g., second brake controller 208b). As another example, one brake controller (e.g., the second brake controller 208b) may have an internal error causing a difference between the two brake controllers.

At decision block 414, first brake controller 208a determines whether the calculated braking is the same, or similar, to that provided by second brake controller 208b. If it is determined that the calculated braking is different, method 400 proceeds to block 410 where first brake controller 208a handles the fault. If, instead, it is determined that the calculated braking is the same, then method 400 proceeds to block 416.

At block 416, first brake controller 208a applies the calculated braking to the brake. This may include sending a message to the brakes to apply braking.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of braking an aircraft, comprising:
   receiving, by a brake controller, a first signal from a position sensor of a first pedal;
   receiving, by the brake controller, a second signal from a pedal sensor of the first pedal;
   determining, by the brake controller, that the pedal is being pressed based on the first and second signals;
   calculating, by the brake controller, an amount of pressure to apply based on the first signal;
   receiving, by the brake controller, a second amount of pressure to apply from a second brake controller;
   comparing, by the brake controller, the amount of pressure to apply and the second amount of pressure to apply; and
   sending, by the brake controller, an instruction to apply a brake pressure in response to the determination that the amount of pressure and the second amount of pressure are the same.

2. The method of claim 1, wherein the instruction to apply the brake pressure is based at least in part on the first signal.

3. The method of claim 1, further comprising:
   receiving, by the brake controller, a third signal from a second position sensor of a second pedal;
   receiving, by the brake controller, a fourth signal from a second pedal sensor of the second pedal;
   determining, by the brake controller, that the second pedal is being pressed further than the first pedal based on the third and fourth signals; and
   sending, by the brake controller, the instruction to apply the brake pressure based on the third signal.

4. The method of claim 1, further comprising:
   detecting, by the brake controller, a fault based at least in part on the first signal and the second signal prior to sending the instruction to apply the brake pressure.

5. The method of claim 1, wherein the position sensor provides an indication of how much the first pedal is displaced.

6. The method of claim 1, wherein the pedal sensor provides an indication of whether or not the first pedal is being pressed.

7. An article of manufacture including a tangible, non-transitory computer-readable storage medium having instructions stored thereon that, in response to execution by a processor, cause the processor to perform operations comprising:
   receiving, by a brake controller, a first signal from a position sensor of a pedal;
   receiving, by the brake controller, a second signal from a pedal sensor of the pedal;
   determining, by the brake controller, whether or not the pedal is being pressed based on the first signal and the second signal;
   calculating, by the brake controller, an amount of pressure to apply based on the first signal;
   receiving, by the brake controller, a second amount of pressure to apply from a second brake controller;
   comparing, by the brake controller, the amount of pressure to apply and the second amount of pressure to apply; and
   sending, by the brake controller, an instruction to apply a brake pressure in response to a determination that the amount of pressure and the second amount of pressure are the same.

8. The article of manufacture of claim 7, wherein the position sensor provides an indication of how far the pedal has travelled.

9. The article of manufacture of claim 7, wherein the pedal sensor provides an indication of whether or not the pedal is being pressed.

10. The article of manufacture of claim 7, wherein the operations further comprise:
    identifying, by the brake controller, a fault based at least in part on the first signal and the second signal.

11. The article of manufacture of claim 7, wherein the operations further comprise:
    receiving, by the brake controller, a third signal from a second position sensor of a second pedal;
    comparing, by the brake controller, the first signal and the third signal; and
    sending, by the brake controller, the instructions to apply the brake pressure based on the first signal, the first signal being greater than the third signal.

12. A brake system for an aircraft, comprising:
    a brake assembly configured to supply a brake pressure in response to a pedal being displaced;
    a position sensor configured to provide an indication of an amount of displacement of the pedal;
    a pedal sensor configured to provide an indication that the pedal is being displaced; and
    a brake controller configured to control the brake pressure, the brake controller configured to:
      receive a first signal from the position sensor;
      receive a second signal from the pedal sensor;
      determine that the pedal is being activated;
      calculate an amount of pressure to apply based on the first signal;
      receive a second amount of pressure to apply from a second brake controller;
      compare the amount of pressure to apply and the second amount of pressure to identify a fault in the brake system based on the comparison; and
      modify the brake pressure as a function of pedal displacement in response to the identification of a fault.

13. The brake system of claim 12, wherein the determination that the pedal is being activated is based on the first signal.

14. The brake system of claim 13, wherein the determination that the pedal is being activated is further based on the second signal.

15. The brake system of claim 12, wherein the pedal sensor provides an indication that the pedal is being pressed.

* * * * *